United States Patent [19]
O'Farrell et al.

[11] 3,887,530
[45] June 3, 1975

[54] SEMI-CRYSTALLINE SULFONATED EDPM ELASTOMERIC IONOMERS

[75] Inventors: Charles P. O'Farrell, Clark; Edward N. Kresge, Watchung, both of N.J.

[73] Assignee: Exxon Research and Engineering Company, Linden, N.J.

[22] Filed: Mar. 15, 1974

[21] Appl. No.: 451,384

[52] U.S. Cl............................ 260/79.3 R; 260/41 R
[51] Int. Cl... C08d 11/02; C08d 13/30; C08f 27/06
[58] Field of Search.................. 260/79.5 R, 79.3 R

[56] References Cited
UNITED STATES PATENTS

| | | | |
|---|---|---|---|
| 3,072,618 | 1/1963 | Turbak | 260/79.3 R |
| 3,205,285 | 9/1965 | Turbak et al. | 260/79.3 R |
| 3,280,082 | 10/1966 | Natta et al. | 260/80.7 |
| 3,322,734 | 5/1967 | Rees | 260/79.3 M |
| 3,642,728 | 2/1972 | Canter | 260/79.3 R |
| 3,770,682 | 11/1973 | Hubbard et al. | 260/79.3 R |

*Primary Examiner*—Ronald W. Griffin
*Attorney, Agent, or Firm*—A. Lagani, Jr.

[57] ABSTRACT

EDPM polymers containing at least 2% crystallinity sulfonated to form elastomeric ionomers having improved physical properties over similar low unsaturated polymers and, in particular, similar sulfonated EDPM's which lack crystallinity.

9 Claims, No Drawings

SEMI-CRYSTALLINE SULFONATED EDPM ELASTOMERIC IONOMERS

BACKGROUND OF THE INVENTION

This invention relates to novel EPDM polymers containing sulfonic acid groups or sulfonic acid salts and crystallinity. Hydrocarbon polymers generally fall into two broad classes — thermoplastic and thermosetting resins. Thermoplastic resins may be readily worked by heating the polymer up to its softening point or melting point. They may then be processed by such deformation methods as vacuum forming, extrusion of a melt, injection molding, compression molding, etc.

Thermoset resins can generally not be worked once they have hardened. In general, most thermoset resins owe their unique properties to covalent crosslinks between polymer molecules.

Similarly, elastomers may be crosslinked or vulcanized by the use of the sulfur accelerators which react to carbon of the unsaturated bond in the polymer molecules to form, in effect, a thermoset product which can no longer be fabricated or worked except by machining. The vulcanized polymers have found wide utility because of their significant improvement in physical properties by crosslinking. Natural rubber, for example, may be crosslinked or vulcanized by the use of sulfur which reacts to the carbon of the unsaturated bonds in the polymer molecule to form a bridge between two molecules so that one polymer molecule is covalently bonded to the second molecule. If sufficient crosslinks of this type occur, all molecules are jointed into a single, giant molecule. Once crosslinked, the polymer is intractable and can no longer be fabricated except possibly by machine. It has, however significantly improved physical properties. Thus, by vulcanizing rubber, elasticity, impact resistance, flexibility, thermomechanical stability and many other properties are either introduced or improved.

A third class of polymers has recently been developed which, although they are crosslinked, have a softening point or softening range of temperatures and may even be dissolved in various solvents. At normal use temperatures, these polymers behave similarly to crosslinked polymers. At elevated temperature, however, they are readily deformed and worked in the same manner as thermoplastic resins. Such polymers are said to be physically crosslinked. An example of such materials is ionic hydrocarbon polymers (ionomers). These products owe their unique properties to the fact that crosslinking is accomplished by ionic rather than covalent bonding between molecules of the polymers. Typical of these ionic polymers are copolymers of ethylene and ethylenically unsaturated mono- or di-carboxylic acids which have been neutralized by metal salts (see, for example, British Pat. No. 1,011,981 and U.S. Pat. No. 3,264,2727.

In addition to the ionic bonding, polymers have been prepared that are crosslinked by crystalline polymer segments or blocks. These polymers are processable above the crystalline melting point but below it exhibit many of the properties of a covalently crosslinked elastomer. Examples of elastomeric polymers crosslinked by crystallinity are found in U.S. Pat. No. 3,480,696 and British Pat. No. 957,070.

Sulfonic acid ionomers have been prepared by copolymerizing a styrene sulfonic acid salt with other monomers to form plastic monomers containing ionic crosslinks. See, for example, U.S. Pat. No. 3,322,734 incorporated herein by reference.

Methods of sulfonating polymers are well known to the art. For example, aromatic containing polymers are sulfonated by a method described in U.S. Pat. No. 3,072,618 wherein a complex of lower alkyl phosphates and $SO_3$ is used as the sulfonating agent. These sulfonated, aromatic polymers have generally been sulfonated to a sufficient extent to be water soluble in the form of their alkali metal salt. Other aromatic-containing resins have been sulfonated and converted to their alkali metal salts by use of ionexchange resins. Water soluble resins have been prepared by reacting aromatic rings in styrene-butyl rubber graft polymers with $SO_3$ to form a viscous sulfonation product. See, for example, Soviet Pat. No. 211,079.

Attempts have been made to sulfonate unsaturated polymers. See, for example, British Pat. No. 818,032 which teaches the sulfonation of butyl rubber with chlorosulfonic acids. The reaction product is a degraded low molecular weight viscous liquid.

Natural rubber has been sulfonated by complexing chlorosulfonic acid with ethers or esters and reacting the complexed rubber in solution; see, for example, German Pat. Nos. 582,565; 550,243 and 572,980, wherein water-soluble products were obtained by sulfonating the rubber and preparing salts of acids with alkalis, alkaline earths, heavy metals and organic bases. The high sulfonated rubbers were found to be water-soluble.

Saturated polyolefins have similarly been sulfonated using complexes of lower alkyl phosphorus compounds and $SO_3$. See, for example, U.S. Pat. No. 3,205,285, which teaches the dyeability of polypropylene may be improved by reacting propylene fibers with an $SO_3$ complex, and reacting said treated fibers with alkali salts to improve their dye-ability.

More recently, ionomers of butyl rubber and ethylene-propylene-diene monomers (EPDM) have been prepared and found to have improved physical properties. See, for example, U.S. Pat. No. 3,642,728, incorporated herein by reference.

SUMMARY OF THE INVENTION

It has surprisingly now been found that sulfonated EPDM polymers which contain at least 2% crystallinity demonstrate improved physical properties and rheological properties over amorphous EPDM's when sulfonated to form ionomers.

DETAILED DESCRIPTION

This invention relates to sulfonated EPDM polymers containing crystallinity.

The term EPDM Is used in the sense of its definition as found in ASTM D-1418-64 and is intended to mean terpolymers containing ethylene and propylene in the backbone and a diene in a side chain which results in an U.S. Illustrative methods for producing these terpolymers are found in U.s. Pat. No. 3,280,082, British Pat. No. 1,030,289 and French Pat. No. 1,386,600, incorporated herein by reference. The preferred polymers contain about 2 to about 10 weight percent of diene monomer, the balance of the polymer being ethylene and propylene. Preferably, the polymer contains about 2.6 to about 4 weight percent diene monomer, e.g. 3.3 weight percent. The diene monomer is a non-conjugated diene. Illustrative of these nonconjugated diene monomers which may be used as terpolymer (EPDM) are hexadiene, dicyclopentadiene, ethylidene norbornene, methylene norbornene, propylidene norbornene, and methyltetrahydroindene.

The polymers used in the practice of this invention must contain at least 2 percent and less than about 50 percent crystallinity by weight as determined by x-ray diffraction at 25°C.; preferably about 3 to about 15 percent; more preferably about 5 to 12 percent, e.g., 10 percent crystallinity. At lower concentrations, the crystallinity will not improve physical properties and at higher concentrations the polymer becomes non-elastomeric. The crystallinity may be derived from either ethylene or crystalline (isotactic) propylene segments of the polymer.

Methods of producing crystalline EPDM are well known in the art. In the case of ethylene crystallinity, the polymers are typically synthesized using a soluble transition metal catalyst based on a vanadium halide in combination with an aluminum alkyl halide. The composition of the polymer is regulated to produce crystalline ethylene segments. It is not necessary that all of the polymer chains have the same crystallinity. In fact, it is sometimes desirable to have some fraction of the polymer with a high degree of crystallinity while the remaining fractions have a lesser amount. The actual ethylene content of polymers that contain ethylene crystallinity will vary according to both the relative ethylene content among the chains in the polymer and the sequential distribution of ethylene within each chain in the polymer. Some fraction of the polymer may be polyethylene to provide crystallinity so long as the final ionomer is elastomeric.

In the case of polypropylene type crystallinity, the polymers are typically synthesized using an insoluble transition metal catalyst based on a titanium halide in combination with an aluminum alkyl halide such that isotactic polypropylene sequences are produced that can crystallize. As in the case with ethylene crystallinity, the propylene content of the polymer is regulated to produce the desired amount of crystallinity, and the relative amount of propylene is controlled by the sequential distribution of propylene within each polymer chain and the content among the polymer chains. Some fraction of the polymer may also be isotactic polypropylene so long as the final ionomer is elastomeric.

The EPDM's useful in the practice of this invention have number average molecular weights of about 5,000 to about 250,000; more preferably, a number average molecular weight of about 10,000 to about 100,000. The molecular weight chosen depends on the rheological characteristics desired in the final ionomer.

In carrying out the present invention, the EPDM is sulfonated with a sulfonating agent. The sulfonating agent itself is not critical. Illustrative of the sulfonating agents which may be used are sulfur trioxide donors in combination with a Lewis base containing oxygen, nitrogen or phosphorus. The Lewis base serves as the complexing agent for the sulfur trioxide donor.

The term "sulfur trioxide donor" as used in the specification and claims means a compound containing available sulfur trioxide. Illustrative of these sulfur trioxide donors are $SO_3$, chlorosulfonic acid, fluorosulfonic acid, sulfuric acid, oleum, etc. The term "complexing agent" as used in the specification and claims means a Lewis base suitable for use in the practice of this invention. A Lewis base is an electron pair donor.

In a preferred embodiment, the base and available sulfur trioxide are contacted prior to admixing them with the organic substance to form a complex. However, it is not essential to premix the available sulfur trioxide with a complexing agent, but rather it is only necessary to have the latter compound present during the sulfonating reaction. The available sulfur trioxide and complexing agent, for instance, may be admixed simultaneously with the organic substance and the complex may be formed in situ in the sulfonating zone.

Because the complexing agent effects the reactivity of the available sulfur trioxide, the sulfonation temperature need not be maintained below 0°C., but rather it may be varied from as low as $-100°C.$ to as high as $100°C.$ Moreover, the pressure is not a critical condition and may be adjusted to any satisfactory level. For instance, sulfonation may be carried out from a reduced pressure of about 0.5 atmospheres up to superatmospheric pressure of about 10 atmospheres. The most suitable conditions from an economic standpoint are temperatures of about 15° to 40°C. and pressures which are approximately atmospheric. The sulfonation time will, of course, vary with particular conditions selected, the polymer being sulfonated, and the complex used. Generally, the reactions are completed within a few seconds to several hours after the reactants are contacted with each other. When sulfonating at approximately room temperature and atmospheric pressure, the contact time should be about 5 seconds to about 25 or 30 minutes. Since the complexing agent reduces the activity of the sulfur trioxide, it is not necessary to limit the sulfonating time as is required in commercial processes. Illustrative of the Lewis bases suitable for use as complexing agents are certain phosphorus compounds. While the phosphorus compounds may be either organic or inorganic, it is preferred that the phosphorus compounds be inorganic compounds having the general formula

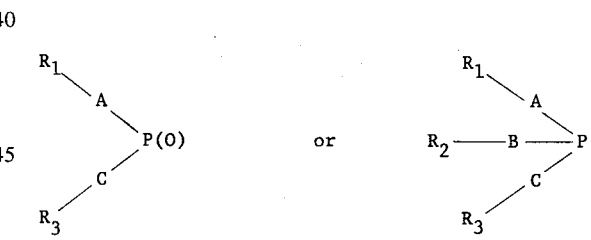

where A, B and C are independently selected from the group consisting of oxygen and methylene and $R_1$, $R_2$ and $R_3$ are independently selected from the group consisting of $C_1$–$C_{10}$ alkyl, aryl, alkaryl or aralkyl. Various organic phosphites, phosphonates, phosphonites, phosphates, and phosphines may be used as the complexing agent. Illustrative of the phosphorus containing inorganic complexing agents are phosphoric acid, phosphorus acid, pyrophosphoric acid, metaphosphoric acid, phosphonic acid and phosphenic acid. The preferred phosphorus compounds are trialkyl phosphates and phosphites.

Other suitable sulfonating agents are the acyl sulfates, in particular acetyl sulfate. The acyl sulfates may be produced by reacting sulfuric acid with the anhydride. For example, acetic anhydride may be reacted with sulfuric acid to form acetyl sulfate which may be used to sulfonate the polymers of this invention. If desired, acetic anhydride may be added to a solution of the polymer in a suitable solvent and sulfuric acid subsequently added to form acetyl sulfate in situ. Alternately, sulfur trioxide may be reacted with acetic acid to form the acyl sulfate. As has been pointed out earlier, neither the sulfonating agent nor the manner of sulfonation is critical, provided that the sulfonating method does not degrade the polymer backbone.

Nitrogen-containing Lewis bases which form active complexes of sulfur trioxide donors and which are suitable for the sulfonation of unsaturation polymers of this invention have the general formula

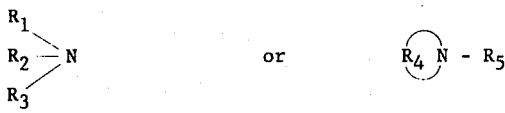

wherein $R_1$, $R_2$, $R_3$ and $R_5$ are independently selected from the group consisting of hydrogen or $C_1$–$C_{36}$ alkyl, aryl, alkylaryl, aralkyl, or mixtures thereof; where $R_1$ and $R_2$ are hydrogen, $R_3$ may not be hydrogen; and $R_4$ is selected from the group consisting of $C_3$–$C_{36}$ alkaline. Broadly speaking, the nitrogen-containing Lewis base may be any primary, secondary or tertiary organic amine or cyclic organic amine. The term "sulfonating agent" as used in the specification and claims means the sulfur trioxide donor in conjunction with a Lewis base, complexing agent, or acyl sulfates.

In the practice of this invention, the polymer to be sulfonated is dissolved in a suitable solvent and reacted with the sulfonating agent. The solvent medium must be a neutral one for the rubber and the sulfonating agent. The solvent is preferably nonaromatic. Illustrative of such solvents are alkanes, fluorinated alkanes, ethers, esters, or mixtures thereof. The alkane may be linear, branched or cyclic. Illustrative of these alkanes are hexane, pentane, butane and cyclohexane, heptane and homologs and analogs thereof. Illustrative of the fluorinated alkanes are methyl chloride, ethyl chloride, dichloroethane, chloroform, fluoride, carbon tetrachloride or higher alkane or fluorinated alkanes. When the sulfonating agent is acyl sulfate, either nonaromatic solvents as described above or aromatic solvents such as benzene, toluene and xylene can be used.

Sulfonation of the polymer is conducted at a temperature between −100° and +100°C. Sulfonation occurs when the sulfonating agent is added to the polymer solution. Sulfonating agent is preferably dissolved in a suitable solvent, or may be added directly without solvent. Reaction time may be 5 seconds to 3 hours. The product remains soluble throughout the reaction period. The product can most easily be recovered by flashing off the solvent in hot water. Water also decomposes the unreacted sulfonating agent. The product may also be recovered by evaporation of the solvent by a suitable means.

Sulfonated polymer may be purified further if necessary by heating in the presence of low boiling ketones or alcohols. Preferred materials for this purpose are acetone and methanone. After heating the polymer, they are dried on a hot mill or in an extruder. The recovered product is soluble in a variety of solvents which indicates that sulfonation has been accomplished without crosslinking. The sulfonic acid-containing polymers have improved properties over those of the unsulfonated polymers. The properties are attributed to hydrogen bonding of the sulfonic acid groups.

The amount of desirable sulfonation depends on the particular application. Preferably, the polymer is sulfonated at about $4 \times 10^{-5}$ to $5 \times 10^{-4}$ moles of $SO_3H/g$; more preferably about $8 \times 10^{-5}$ to about $4 \times 10^{-4}$ moles $SO_3H/g$ most preferably about $9 \times 10^{-5}$ to about $3.0 \times 10^{-4}$, e.g., about $10^{-4}$ to about $2.5 \times 10^{-4}$. Polymers containing unsaturation and sulfonic acid groups have been found to be somewhat deficient in thermostability. Therefore, it is desirable to neutralize at least a portion of the sulfonic acid as part of the manufacturing of sulfonated EPDM polymers. Neutralization further improves the physical properties of the sulfonated polymer. Various methods may be used to neutralize the acid. For example, a metal compound may be solubilized and added in solution to the ploymer with good mixing. This neutralization reaction may be illustrated by the equation:

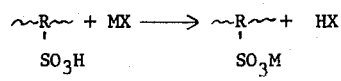

wherein ~~~ represents the polymer backbone and MX represents the metal compound wherein M is a metal and X preferable is selected from the group consisting of hydroxyl, alkoxy, or the counterion of a weak acid such as carboxylic acids. Amine compounds and guanidines may also be used to neutralize the acids. The neutralization of the sulfonic acid groups results in ionic bonding within the polymer, i.e., neutralized polymer is an ionomer.

In preparing the ionomer, substantially all of the sulfonic acid groups should be neutralized. The term "substantially neutralized" as used in the specification and claims means at least 98% neutralized.

The metal ions which are suitable in forming the ionic polymers of the present invention may be classified into two groups: non-complexed metal ions and complexed metal ions. In the non-complexed metal ion, the valence of the ion corresponds to the valence of the metal. These metal ions are obtained from commonly known and used metal salts.

The complex metal ions are those in which the metal is bonded to more than one type of salt group and at least one of which is ionized and one of which is not. Since the formation of ionic polymers requires only one ionized valence, such complexed metal ions are equally well suited for use in the present invention. The utility of complexed metal ions employed in the formation of ionic copolymers corresponds in their ionized valences to those of the non-complexed ions. The monovalent metals are, of course, excluded, but the higher valent metals may be included depending upon how many metal ions are complexed and how many can be ionized. The preferred complex metal ions are those in which all but one of the metal valences are complexed and one is readily ionized. In particular, the mixed salts of very weak acids such as stearic acid and ionized acids such as formic and acetic acids may be utilized.

The non-complexed metal ions which are suitable in forming ionic copolymers in the present invention comprise mono, di, tri and tetravalent metals in Groups I, II, III, IV, V, VI-B, VII-B and VIII of the Periodic Table of the Elements (see pages B-3, Handbook of Chemistry and Physics, Chemical Rubber Publishing Co., 47th Ed.). Suitable monovalent metal ions are $Na^+$, $K^+$, $Li^+$, $Cs^+$, $Ag^+$, $Hg^+$ and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Fe^{+2}$, $Pb^{+2}$, $Co^{+2}$, $Ni^{+2}$ and $Zn^{+2}$. Suitable trivalent metal ions are $Al^{+3}$, $Co^{+3}$, $Fe^{+3}$ and $Y^{+3}$. Suitable tetravalent metal ions are $Sn^{+4}$, $Zr^{+4}$, $Ti^{+4}$ and $Pb^{+4}$.

In addition to the metal ions, other basic materials such as primary, secondary and tertiary amines may be used to form the ionic bonds. The preferred amines are organic amines wherein the organic radicals are $C_1$ to $C_{30}$ alkyl, phenyl, aralkyl or alkaryl. More preferably, the organic radical is a phenyl, $C_1$ to $C_{10}$ alkyl, $C_7$ to $C_{10}$ alkylaryl or $C_7$ to $C_{10}$ aralkyl. Illustrative of such amines are anhydrous piperazine, triethylamine, tri-n-propylamine and tetraethylene-pentamine. The secondary and tertiary amines are more preferred especially piperazine and tri-n-propylamine. A particularly preferred neutralization agent is ethylamine.

Guanidines are also useful neutralizing agents for the sulfonic acid groups to produce ionic sites. The preferred guanidines are guanidine or substituted guanidines wherein the substituent organic radicals are $C_1$ to $C_{30}$ alkyl, phenyl, aralkyl, or alkaryl. Illustrative of such guanidines are tetra-methyl guanidine, di-phenyl guanidine and di-ortho-tolyl guanidine.

Mixtures of metal ions, amines or guanidines are useful neutralizing agents for the sulfonic acid groups.

The advantages of the sulfonated EPDM polymers of this invention may be further illustrated by the following examples.

EXAMPLE 1

Sulfonation of Semi-Crystalline EPDM

An ethylene-propylene-ethylidine norbornene terpolymer, 120.0 g containing 75.4 wt. % $C_2$ and 3.1 wt. % ENB and exhibiting 9% crystallinity at 25°C., was dissolved in 3.5 l of heptane by heating to 80°C for 48 hrs. The polymer cement was divided into three equal portions and cooled to 55°C. The three samples were contacted for 20 min. with 3, 6 and 9 ml. of a sulfonation complex respectively. The complex was formed by adding 1.2 ml of triethylphosphate to 18 ml. of methylene chloride and slowly adding 0.83 ml. of sulfur trioxide. The acid form of the sulfonated polymers were neutralized using stoichiometric amounts of sodium hydroxide in methanol. The cements were steam stripped, dried on a hot mill and analyzed for sulfur content.

| Polymer | 1A | 1B | 1C |
|---|---|---|---|
| ml of complex added | 3 ml | 6 ml | 9 ml |
| wt. % sulfur | 0.13 | 0.36 | 0.45 |
| $SO_3H$ (moles/g) | $4.1\times10^{-5}$ | $1.1\times10^{-4}$ | $1.4\times10^{-4}$ |

EXAMPLE 2

Tensile Properties of Unvulcanized Sulfonated Semi-Crystalline EPDM of Example 1 at Room Temperature Portions of the three samples of the sulfonated polymer as prepared per Example 1 were molded into micropads by compression molding at 300°F. Other portions of the sulfonated polymers were compounded with 50 phr of Philblack 0 and 25 phr of Flexon 886 oil and compression molded into micropads at 300°F. The tensile properties of the loaded and unloaded stocks were determined on an Instron at 25°C.

| | Semi-Crystalline | | | |
|---|---|---|---|---|
| Polymer (unloaded) | EPDM | 1A | 1B | 1C |
| 500% Modulus, psi | 470 | 470 | 700 | 875 |
| Tensile Strength, psi | 2300 | 930 | 1650 | 1985 |
| Elongation, % | >2000 | | | |
| Polymer (loaded) | | | | |
| 50 phr black, 25 phr oil | | | | |
| 300% Modulus, psi | 475 | 515 | 665 | 730 |
| Tensile Strength, psi | 890 | 975 | 1050 | 900 |
| Elongation, % | 145 | 515 | 585 | 400 |
| Set at break, % | 140 | 31 | 28 | 25 |

EXAMPLE 3

Tensile Properties of Unvulcanized Sulfonated Semi-Crystalline EPDM of Example 1 at Elevated Temperatures The same procedure as described in Example 2 was repeated except that the test specimens of the respective polymers were tested at 85°C. on an Instron tensile tester.

| | Semi-crystalline | | | |
|---|---|---|---|---|
| Polymer (unloaded) | EPDM | 1A | 1B | 1C |
| 200% Modulus, psi | 45 | 45 | 75 | 110 |
| Tensile Strength, psi | 35 | 35 | 75 | 115 |
| Elongation, % | 300 | 350 | 275 | 270 |
| Polymer (loaded) | | | | |
| 50 phr black, 25 phr oil | | | | |
| 200% Modulus, psi | 25 | — | — | — |
| Tensile Strength, psi | 25 | 50 | 140 | 175 |
| Elongation, % | 200 | 185 | 180 | 100 |
| Set at Break, % | 200 | 10 | 8 | 5 |

Examples 1, 2 and 3 show that using ionomeric linkages in combination with a limited degree of crystallinity substantially improves the physical properties over a polymer having only crystallinity. The semi-crystalline EPDM containing no ionic linkages has almost no recovery after extension to break while the sulfonated and neutralized material exhibits the recovery of a vulcanized elastomer.

EXAMPLE 4

Sulfonation of Semi-Crystalline EPDM Neutralized with Ethylamine

The same procedure and amount of reagents were repeated as described in Example 1 except that the acid form of the sulfonated polymers were neutralized using stoichiometric amounts of ethylamine. The finished polymer was molded into micropads and the physical properties were determined at room temperature and at 85°C. Portions of the same polymers were also compounded with 50 phr Philblack 0 and 25 phr of Flexon 885 oil. The unvulcanized green tensile properties of these stocks were also determined, at 25° and 85°C.

Table A

| | Room Temperature (25°C) | | | |
|---|---|---|---|---|
| | Semi-crystalline | | | |
| Polymer (unloaded) | EPDM | 4A | 4B | 4C |
| 500% Modulus, psi | 470 | 485 | 660 | 650 |
| Tensile Strength, psi | 2300 | 1240 | 3700 | 3950 |
| Elongation, % | >2000 | 1250 | 1150 | 1070 |
| Polymer (loaded) | | | | |
| 300% Modulus, psi | 475 | 650 | 530 | 535 |
| Tensile Strength, psi | 890 | 1950 | 2030 | 2000 |
| Elongation, % | 145 | 970 | 1055 | 975 |

Table A-Continued

Room Temperature (25°C)

Table B

Elevated Temperature (85°C)

| | Semi-crystalline EPDM | 4A | 4B | 4C |
|---|---|---|---|---|
| Polymer (unloaded) | | | | |
| 200% Modulus, psi | 45 | 30 | 75 | 95 |
| Tensile Strength, psi | 35 | 35 | 75 | 100 |
| Elongation, % | 300 | 375 | 320 | 320 |
| Polymer (loaded) 50 phr black, 25 phr oil | | | | |
| 200% Modulus, psi | 25 | 30 | 55 | 80 |
| Tensile Strength, psi | 25 | 45 | 60 | 80 |
| Elongation, % | 200 | 220 | 250 | 220 |

This example shows the improvement in physical properties of a semi-crystalline EPDM containing sulfonic acid groups neutralized with ethylamine over the non-sulfonated EPDM.

EXAMPLE 5

Sulfonation of Non-Crystalline EPDM

Ethylene propylene, ethylidine norbornene terpolymer, 120.0 g containing 58 wt. % $C_2$ and 3.1 ENB, was dissolved in 3.5 l of heptane by heating to 70°C for 24 hours. The polymer cement was divided into three equal portions and contacted with 3, 6 and 9 ml of complex (prepared as per Example 1), respectively. The acid form of the sulfonated polymers were neutralized using stoichiometric amounts of sodium hydroxide in methanol. The cements were steam stripped and dried on a hot mill.

EXAMPLE 6

Physical Properties of Sulfonated Non-Crystalline EPDM at Room Temperature and 85°C.

The sulfonated polymers prepared per Example 5 were molded into micropads and the unvulcanized gum tensile were determined at 25° and 85°C. Portions of the same polymers were compounded with 50 phr Phil-black 0 and 25 phr Flexon 885 oil. The physical properties of these samples were also tested at 25 and 85°C. on an Instron.

Table A

Room Temperature (25°C)

| Polymer (unloaded) | Non-Crystalline EPDM | 5A | 5B | 5C |
|---|---|---|---|---|
| $SO_3H$ moles/g | | $4.6 \times 10^{-5}$ | $1.09 \times 10^{-4}$ | $1.47 \times 10^{-4}$ |
| 300% Modulus, psi | 140 | 90 | 110 | 115 |
| Tensile Strength, psi | 270 | 190 | 220 | 240 |
| Elongation, % | 1650 | 1800 | 1650 | 1400 |
| Polymer (loaded) 50 phr black, 25 phr oil | | | | |
| 300% Modulus, psi | 75 | 95 | 150 | 140 |
| Tensile Strength, psi | 80 | 115 | 210 | 210 |
| Elongation, % | 1500 | 1300 | 1120 | 1000 |

Table B

Elevated Temperature (85°C)

| Polymer (unloaded) | Non-Crystalline EPDM | 5A | 5B | 5C |
|---|---|---|---|---|
| 200% Modulus, psi | 50 | 35 | 40 | 45 |
| Tensile Strength, psi | 50 | 35 | 40 | 45 |
| Elongation, % | 260 | 260 | 370 | 345 |
| Polymer (loaded) 50 phr black, 25 phr oil | | | | |
| 200% Modulus, psi | 30 | — | — | — |
| Tensile Strength, psi | 30 | 35 | 50 | 50 |
| Elongation, % | 210 | 175 | 190 | 20 |

Examples 5 and 6 are for a non-crystalline, amorphous EPDM and show that the presence of polymeric crystallinity is necessary for the present invention.

EXAMPLES 7–13

The following examples illustrate the use of various neutralizing agents in combination with a sulfonated semi-crystalline EPDM. An EPDM containing 3.2 wt % ethylidene norbornene and 10% crystallinity at 25°C. was sulfonated in a 4 wt. % hexane solution with a complex of sulfur trioxide and dioxane at 45°C. to give a sulfur level of 0.83 wt % or $2.6 \times 10^{-4}$ moles $SO_3$/g polymer. The polymers were neutralized and recovered by steam distillation of the solvent and drying on a hot laboratory mill. The polymers were compression molded to give the physical properties as shown in the following table.

| Example No. | 7 | 8 | 9 | 10 | 11 | 12 | 13 |
|---|---|---|---|---|---|---|---|
| Neutralization Agent* | $BaAc_2$ | DOTG | $Bu-NH_2$ | DPG | TMG | $BaAc_2$/DOTG 1/1 | $BaAc_2$/DOTG 1/2 |
| Tensile Properties at 25°C | | | | | | | |
| 100% Modulus, psi | 330 | 360 | 290 | 340 | 300 | 350 | 330 |
| 300% Modulus, psi | 360 | 840 | 530 | 740 | 590 | 780 | 720 |
| Tensile Strength, psi | 1440 | 3910 | 2840 | 3890 | 3100 | 4040 | 3090 |
| % Elongation | 510 | 650 | 700 | 690 | 780 | 680 | 640 |
| % Set at Break | 38 | 38 | 56 | 50 | 44 | 44 | 44 |

*$BaAc_2$ = barium acetate.
DOTG = di-orthotolyl guanidine.
$BuNH_2$ = butyl amine.
DPG = di-phenyl guanidine.
TMG = tetra-methyl guanidine.
$BaAc_2$/DOTG = barium acetate/di-orthotolyl guanidine, 1/1 molar ratio.

What is claimed is:

1. A sulfonated composition comprising an elastomeric EPDM having a number average molecular weight of about 5,000 to about 250,000, a crystallinity of at least 2% to about 50% as determined by X-ray diffraction at 25°C. and sulfonated to about $4\times10^{-5}$ moles $SO_3H$ per gram of polymer to about $5\times10^{-4}$ moles $SO_3H$ per gram of polymer, said sulfonic acid groups being substantially neutralized.

2. The composition of claim 1 wherein the crystallinity of the EPDM is about 3% to about 15%.

3. The composition of claim 1 wherein the crystallinity of the EPDM is about 5% to about 12%.

4. The composition of claim 1 wherein the sulfonate level is about $8\times10^{-5}$ moles/gram to about $4.0\times10^{-4}$ moles/gram.

5. The composition of claim 4 wherein the sulfonate level is about $9\times10^{-5}$ to about $3.0\times10^{-4}$ moles/gram.

6. The composition of claim 5 wherein the sulfonate level is about $1\times10^{-4}$ to about $2.5\times10^{-4}$ moles/gram.

7. The composition of claim 1 wherein the $SO_3H$ groups are neutralized with a neutralizing agent selected from the group consisting of guanidine, di-orthotolyl guanidine and ethylamine.

8. The composition of claim 1 wherein the number average molecular weight is about 10,000 to about 100,000.

9. The composition of claim 1 wherein 100% of the $SO_3H$ groups are neutralized.

* * * * *